United States Patent
Murao et al.

(10) Patent No.: US 6,729,570 B1
(45) Date of Patent: May 4, 2004

(54) MAGNETIC TAPE CASSETTE, TAPE REEL AND MAGNETIC TAPE

(75) Inventors: Naoto Murao, Kanagawa (JP); Makoto Sato, Kanagawa (JP); Mitsugu Yamagishi, Kanagawa (JP); Kiyoo Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/913,612

(22) PCT Filed: Feb. 15, 2000

(86) PCT No.: PCT/JP00/00835

§ 371 (c)(1),
(2), (4) Date: Aug. 16, 2001

(87) PCT Pub. No.: WO00/49614

PCT Pub. Date: Aug. 24, 2000

(30) Foreign Application Priority Data

Feb. 16, 1999 (JP) ............................... 11-037533

(51) Int. Cl.$^7$ ............................................. G11B 23/087
(52) U.S. Cl. ..................... 242/345; 242/610.6; 360/132
(58) Field of Search ................................. 242/614, 345, 242/610.6; 360/132

(56) References Cited

U.S. PATENT DOCUMENTS 5,827,599 A    10/1998    Murao et al. ............... 428/330

FOREIGN PATENT DOCUMENTS

| JP | 4-3310    | 1/1992  |
|----|-----------|---------|
| JP | 7-32767   | 6/1995  |
| JP | 7-320446  | 12/1995 |
| JP | 11-306714 | 11/1999 |

*Primary Examiner*—John Q. Nguyen
(74) *Attorney, Agent, or Firm*—Sughrue Mion, PLLC

(57) ABSTRACT

A tape reel (10) is so constructed that an upper flange (12) and a lower flange (13) are respectively provided at an upper and a lower ends of a cylindrical reel hub (11) around which a magnetic tape (20) is wound, and a maximum value of a distance from the upper flange (12) and the lower flange (13) to lateral ends of the magnetic tape (20) is set to be 0.5 mm or more, and less than 1.0 mm. The magnetic tape (20) includes a nonmagnetic substrate (21), a magnetic layer (22) provided on one face of the nonmagnetic substrate and a back layer (23) provided on the other face of the nonmagnetic substrate, and in a state where the magnetic tape is wound around the tape reel (10), a distance (U1+D1) from the upper flange (12) and the lower flange (13) to lateral ends of the back layer (23) is larger than a distance (U2+D2) from the upper flange (12) and the lower flange (13) to lateral ends of the nonmagnetic substrate (21) or lateral ends of the magnetic layer (22). Further, a magnetic tape cassette is provided with at least one of the above described tape reel (10) and the magnetic tape (20). Owing to the above described structure, it is possible to provide the tape reel, the magnetic tape and the magnetic tape cassette in which dropout and output variation are restrained and irregular winding can be prevented.

7 Claims, 5 Drawing Sheets

MAGNETIC TAPE CASSETTE, TAPE REEL AND MAGNETIC TAPE

TECHNICAL FIELD

The present invention relates to a tape reel and a magnetic tape which are applied to a magnetic tape cassette, and more particularly to the tape reel provided with an upper and a lower flanges at an upper and a lower end of a reel hub, and the magnetic tape to be wound around the tape reel.

BACKGROUND OF THE INVENTION

Conventionally, there have been various types of magnetic tape cassettes, namely, for a video recorder, audio apparatus, computer, etc. For example, there has been a type of the magnetic tape cassette for the video recorder which includes a cassette case consisting of an upper and a lower cassette half and a pair of tape reels having a reel hub and an upper and a lower flange rotatably contained in the cassette case in a state where a magnetic tape is wound around the reel hub.

Figure 5:
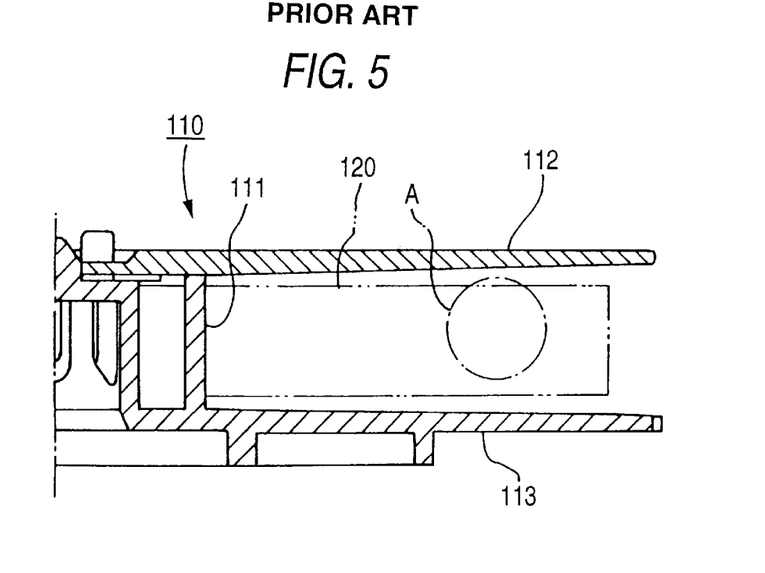
FIG. 5 is a view showing a conventional tape reel.

FIG. 5 shows a basic structure of the above described tape reel. As shown in the drawing, a tape reel 110 includes a reel hub 111 around which a magnetic tape 120 is wound, an upper flange 112 fixed to an upper end of the reel hub 111, and a disc-like lower flange 113 integrally formed at a lower end of the reel hub 111. In this example, a lower face of the upper flange 112 is tapered with respect to a plane perpendicular to an axial direction of the reel hub 111 in such a manner that a radially outer side of the lower face is inclined upward in the drawing. An upper face of the lower flange 113 is tapered in such a manner that a radially outer side of the upper face is inclined downward in the drawing.

Recently, in order to record enormous amounts of information data in a small space, according to digitalization and downsizing of magnetic recording apparatuses, an intention is to improve recording density. The magnetic tape has been made thinner for improvement of volumetric recording density, and tracks have been made narrower for improvement of planar recording density.

Recently, in order to record enormous amounts of information data in a small space, according to digitalization and downsizing of magnetic recording apparatuses, it is intended to improve recording density. The magnetic tape has been made thinner for improvement of volumetric recording density, and tracks have been made narrower for improvement of planar recording density.

However, because the magnetic tape has been made thinner, the magnetic tape has become likely to be deformed in a lateral direction. For example, there have been some cases in which the magnetic tape has deformed in a lateral direction during fast feeding or at acceleration or deceleration of the tape in a recording and reproducing apparatus, and has locally got in touch with a guide roller and so on intensively, resulting in occurrence of a curve or a weaving of the magnetic tape. In addition, there has been a tendency that due to the deformation of the magnetic tape, the lateral ends of the magnetic tape may get in touch with the lower face of the upper flange or the upper face of the lower flange to generate abrasion powder, and dropouts may be increased.

Meanwhile, as the tracks of the magnetic tape have been made narrower, a so-called linearity defect is likely to happen such that reproducing output in the deformed area of the tape may become lower than reproducing output in a rectilinear area. Therefore, even a minute deformation of the tape may result in the linearity defect. As a result, the aforesaid weaving of the magnetic tape will incur and increase the linearity defect, in other words, there will be a variation of the reproducing output.

Figure 6:
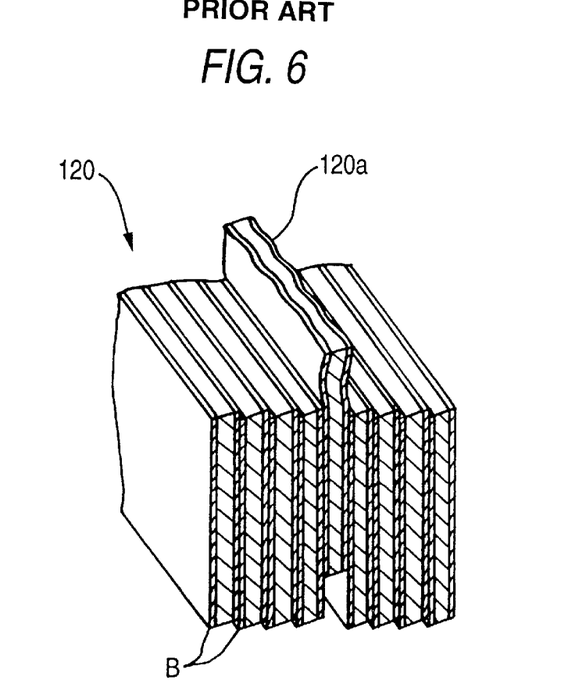
FIG. 6 is a view showing the magnetic tape which has been wound in a conventional manner.

Moreover, because the magnetic tape has become narrower, so-called irregular winding may occur in some cases, when the magnetic tape has been wound around the reel hub. Also, and as shown in FIG. 6, which is an enlarged perspective view of a part A of FIG. 5, a part of the end of the magnetic tape may jump out from a plane formed by the ends of the magnetic tape 120. As shown in FIG. 6, the part 120a of the end of the magnetic tape that jumps out will be deformed weavingly like sea weed. In the case where the magnetic tape has deformed like sea weed, normal recording and reproduction cannot be expected. Therefore, it is extremely important to prevent such irregular winding.

Although various factors have been considered as causes of the irregular winding, it is considered that one cause is air that may enter between adjacent magnetic tapes when the magnetic tape 120 is wound around the reel hub 111 of the tape reel 110, and the magnetic tape may be pushed upward while the air escapes. In the case of a conventional magnetic tape having a thickness of about 10 μm for example, the irregular winding has been able to be restrained by providing a groove in the reel hub 11 of the tape reel. It is considered that because the tape had a large thickness and relatively high rigidity, the magnetic tape could have been wound without involving air by such a measure.

However, as the magnetic tape has become thinner and thinner, it has become more and more difficult to restrain the irregular winding, even though the groove has been provided in the reel hub. It has been found that the irregular winding is likely to happen especially in a case where the thickness of the tape is 7 μm or less.

Meanwhile, it has been found that almost all of the abrasion powder occurring when the ends of the magnetic tape get in touch with the lower face of the upper flange and the upper face of the lower flange is powder generated through abrasion of a back layer. As shown in FIG. 6, the magnetic tape 120 has been heretofore in a shape of parallelogram in cross section. A magnetic recording medium having a large width will inevitably take such a shape when it has been cut by means of a rotary cutter to form the magnetic tape 120. Accordingly, a large amount of the abrasion powder is generated from a part B where an end of the back layer has projected from ends of a magnetic layer and a nonmagnetic layer in a lateral direction of the magnetic tape.

DISCLOSURE OF THE INVENTION

The present invention has been made in view of the above described problems, and its object is to provide a magnetic tape cassette, a tape reel and a magnetic tape in which output variation or dropout can be restrained, and which can perform more accurate recording and reproduction. Particularly, an object of a first embodiment of the invention is to provide the tape reel around which the magnetic tape can be smoothly wound, in which occurrence of deformation in a lateral direction of the magnetic tape and irregular winding can be restrained, and which can perform more accurate recording and reproduction. Further, an object of a second embodiment of the invention is to provide the magnetic tape in which an amount of abrasion powder occurring when the ends of the magnetic tape get in touch with the lower face of the upper flange and the upper face of the lower flange is decreased, and which can perform more accurate recording and reproduction.

The inventors of this invention have had an intensive study and found that deformation of the magnetic tape in a lateral direction and irregular winding can be remarkably restrained by decreasing a distance between the upper flange and the lower flange in the tape reel into a determined distance. Conventionally, it has been considered that if the distance between the upper flange and the lower flange has been decreased, the magnetic tape would be unable to be smoothly wound around the tape reel. However, by setting this distance between the upper flange and the lower flange to be the determined distance taking a width of the magnetic tape into consideration, the magnetic tape can be smoothly wound around the tape reel, and the deformation of the magnetic tape in a lateral direction and occurrence of the irregular winding can be restrained.

Specifically, the first aspect of the present invention is a tape reel comprising an upper flange and a lower flange respectively provided at an upper end and a lower end of a cylindrical reel hub around which a magnetic tape is wound, characterized in that a maximum value of a distance from the upper flange and the lower flange to lateral ends of the magnetic tape is 0.5 mm or more, and less than 1.0 mm.

Moreover, in a case where a thickness of the magnetic tape is 6 $\mu$m or more, and less than 11 $\mu$m, the deformation of the magnetic tape in a lateral direction and occurrence of the irregular winding can be more reliably restrained.

On this occasion, in a case where the lower face of the upper flange and the upper face of the lower flange are respectively tapered, a distance from the ends of the outermost magnetic tape which has been wound around the tape reel to the lower face of the upper flange and the upper face of the lower flange will become "a maximum value of the distance from the upper flange and the lower flange to the lateral ends of the aforesaid magnetic tape". In a case where the lower face of the upper flange and the upper face of the lower flange are in parallel to each other, the distance from the upper flange and the lower flange to the lateral ends of the aforesaid magnetic tape is constant.

Further, the inventors have found as a result of their intensive study that the occurrence of abrasion powder can be remarkably decreased by a construction where an end of the back layer does not project from an end of a nonmagnetic layer in a lateral direction of the magnetic tape.

Specifically, the second aspect of the present invention is a magnetic tape comprising a nonmagnetic substrate, a magnetic layer provided on one face of the nonmagnetic substrate and a back layer provided on the other face of the nonmagnetic substrate, the magnetic tape being adapted to be wound around a tape reel having an upper flange and a lower flange respectively provided at an upper end and a lower end of a cylindrical reel hub, characterized in that in a state where the magnetic tape is wound around the tape reel, a distance from the upper flange and the lower flange to lateral ends of the back layer is larger than a distance from the upper flange and the lower flange to lateral ends of the nonmagnetic substrate or lateral ends of the magnetic layer.

Further, the distance from the upper flange and the lower flange to the lateral ends of the back layer may be larger than both the distance from the upper flange and the lower flange to the lateral ends of the nonmagnetic substrate and to the lateral ends of the magnetic layer.

BEST MODE FOR CARRYING OUT THE INVENTION

Figure 1:
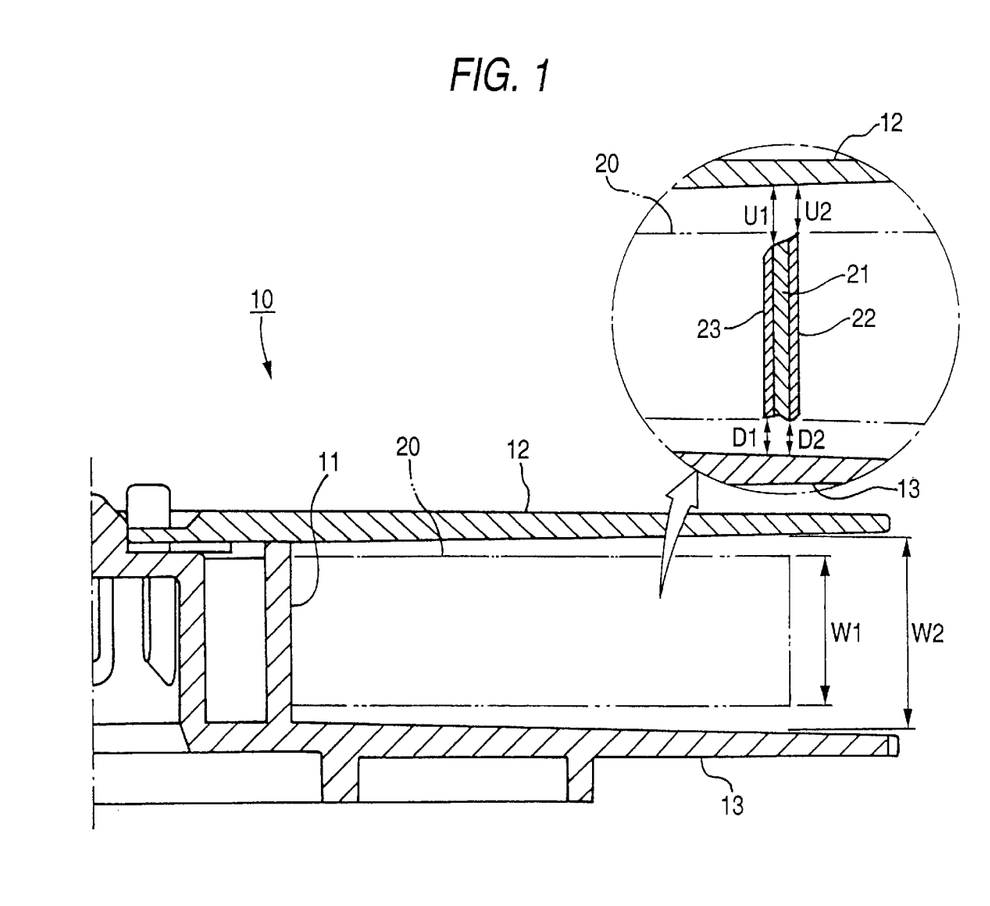
FIG. 1 is a partial sectional view of a part of an embodiment according to the invention.

FIG. 1 shows a tape reel 10 and a magnetic tape 20 according to an embodiment of the invention. The tape reel 10 includes a reel hub 11 in a cylindrical shape around which the magnetic tape 20 is wound, an upper flange 12 in a disc-like shape fixed to an upper end of the reel hub 11, and a lower flange 13 in a disc-like shape formed at a lower end of the reel hub 11 integrally therewith. In this embodiment, a lower face of the upper flange 12 is tapered with respect to a plane perpendicular to an axial direction of the reel hub 11 in such a manner that a radially outward side is inclined upward in the drawing, and an upper face of the lower flange 13 is tapered in such a manner that a radially outward side is inclined downward in the drawing.

The magnetic tape 20 is wound around the reel hub 11 of the tape reel 10 so that gaps are respectively created between the lower face of the upper flange 12 and one of lateral ends of the magnetic tape 20 (an upper end in the drawing), and between the upper face of the lower flange 13 and the other lateral end of the magnetic tape 20 (a lower end in the drawing).

In this embodiment, a width W1 of the magnetic tape 20 is 12.65 mm, and a thickness is 10 $\mu$m. On this occasion, a distance W2 between the lower face of the upper flange 12 and the upper face of the lower flange 13 at a position of an outermost magnetic tape which has been wound around the reel hub 11 in a radial direction of the upper and lower flanges 12, 13 is set to be between 13.15 mm or more and 13.65 mm or less.

In the magnetic tape 20, as shown in a part encircled by an alternate long and short dash line in FIG. 1, a lateral end of a back layer 23 does not project from lateral ends of a magnetic layer 22 and a nonmagnetic layer 21 in a lateral direction of the magnetic tape 20. In other words, a distance from the upper and lower flanges 12, 13 to the ends of the back layer 23 (a sum of a distance U1 between the lower face of the upper flange 12 and an upper end in the drawing of the back layer 23, and a distance D1 between the upper face of the lower flange 13 and a lower end in the drawing of the back layer 23) is larger than a distance from the upper and lower flanges 12, 13 to the ends of the magnetic layer 22 (a sum of a distance U2 between the lower face of the upper flange 12 and an upper end in the drawing of the magnetic layer 22, and a distance D2 between the upper face of the lower flange 13 and a lower end in the drawing of the magnetic layer 22).

The magnetic tape 20 having such a sectional shape can be formed by adjusting delivery speed of a magnetic recording medium and peripheral speed of a rotary cutter when the magnetic recording medium having a large width is cut by the rotary cutter.

According to the tape reel 10 and the magnetic tape 20 having the above described structure, deformation of the magnetic tape 20 in the lateral direction when the magnetic tape 20 is wound around the reel hub 11 is restricted by the lower face of the upper flange 12 and the upper face of the lower flange 13 which are spaced at a determined interval. Moreover, since the lateral end of the back layer will not get in touch with the lower flange 13, abrasion powder will not be generated from the back layer 23. Therefore, linearity defects and dropouts can be reliably decreased.

Figure 2:
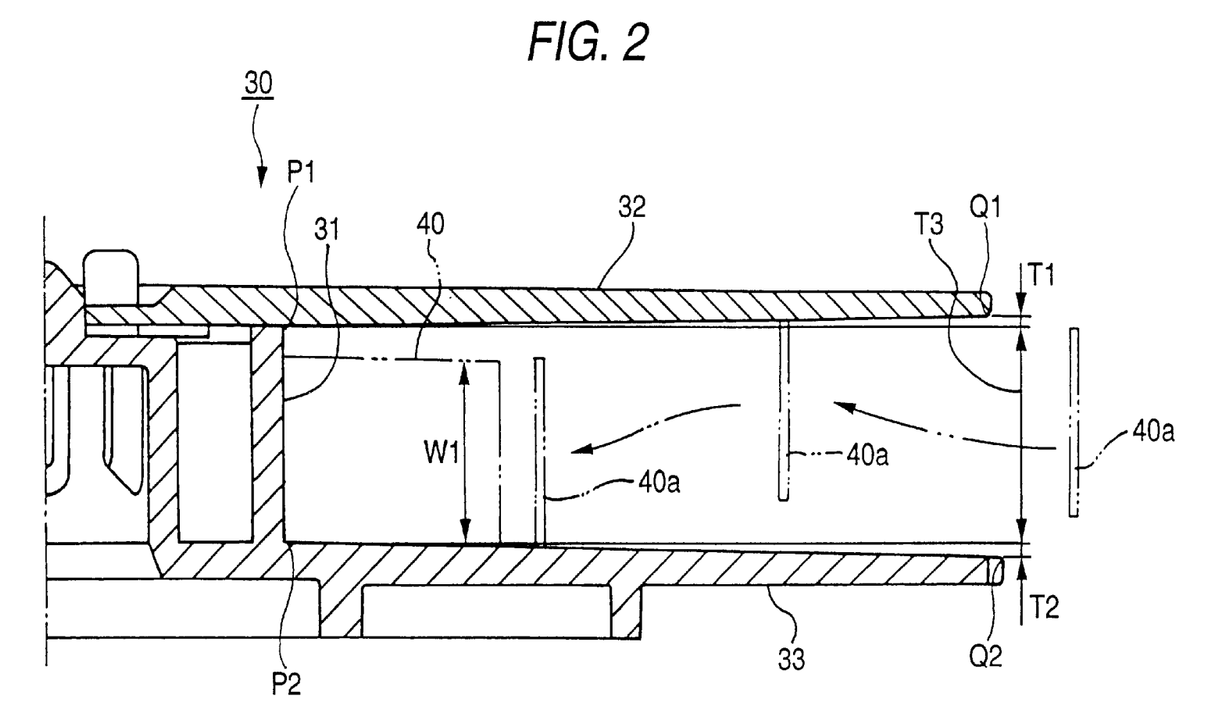
FIG. 2 is a partial sectional view of a part of another embodiment according to the invention.

FIG. 2 shows a tape reel 30 in another embodiment according to the invention. Those members which have been already described will be denoted by the same reference numerals or corresponding signs in the drawing, and their description will be simplified or omitted.

In this tape reel 30 too, a lower face of an upper flange 32 is tapered in such a manner that a radially outward side is inclined upward in the drawing, and an upper face of a lower flange 33 is tapered in such a manner that a radially outward side is inclined downward in the drawing. A magnetic tape 40 is wound around the tape reel 30 so that one of lateral ends (a lower end in the drawing) of the magnetic tape 40 may be in contact with the upper face of the lower flange 33.

In this embodiment, a width W1 of the magnetic tape 40 is 6.35±0.3 mm, a thickness is 6.7+0/−0.4 μm (In other words, the thickness has a tolerance of 0 in a plus direction and a tolerance of at most 0.4 in a minus direction from a standard of 6.7 μm). In this case, an amount of inclination T1 of the upper flange 32 is 0–0.15 mm, an amount of inclination T2 of the lower flange 33 is 0.25–0.5 mm, a height of a reel hub 31, that is, a distance T3 between the lower face of the upper flange 32 as and the upper face of the lower flange 33 near the reel hub 31 is 6.75 mm. A diameter of both the upper and lower flanges 32, 33 may be about 60 mm, and an outer diameter of the reel hub 31 may be about 19 mm.

It is to be noted that the amount of inclination T1 of the upper flange 32 in this embodiment means a height of an outer circumferential end Q1 of the upper flange 32 provided that a height of a root P1 of the reel hub 31 is zero, in case where the lower face of the upper flange 32 is tapered in such a manner that the radially outward side is inclined upward in the drawing. Similarly, the amount of inclination T2 of the lower flange 33 in this embodiment means a height of an outer circumferential end Q2 of the lower flange 33 provided that a height of a root P2 of the reel hub 31 is zero, in a case where the upper face of the lower flange 33 is tapered in such a manner that the radially outward side is inclined downward in the drawing.

On occasion when winding the magnetic tape 40 around the tape reel 30, in a case where the magnetic tape 40a to be wound may be deformed in a lateral direction and get in touch with the lower face of the upper flange 32 as shown in FIG. 2, the relevant magnetic tape 40a will be pushed by the lower face of the upper flange toward the lower flange without generating abrasion powder. Then, the relevant magnetic tape 40a will get in touch with the upper face of the lower flange 33 when it is abutted against the outermost magnetic tape 40 which has been already wound.

On occasion when successively winding the magnetic tape around the tape reel 30, while a distance between the upper end in the drawing of the outermost magnetic tape which has been already wound and the lower face of the upper flange 32 is 1 mm or less, the magnetic tape 40a will be pushed toward the lower flange by the above described action, and reliably get in touch with the upper face of the lower flange 33. With this action, occurrence of the irregular winding can be remarkably restrained.

EXAMPLES

Now, remarkable effects of the invention will be described referring to examples of the invention.

Tape reels having such a shape as shown in FIG. 1 and having such flange widths as shown in Table 1 (Examples 1 to 3, Comparative examples 1 to 4) are constructed employing magnetic tapes having such tape thicknesses and tape widths as shown in Table 1. Then, magnetic tape cassettes have been produced employing these tape reels. Variation of outputs and increase of dropouts (DO) of the produced magnetic tape cassettes have been measured. The results of the measurements are shown in Table 1.

For reference, the variation of the outputs has been measured. It is 0% in a case where a width of an envelope of an RF output is normal and it is 100% in a case where there is no signal. The increase of the dropouts has been measured by running the magnetic tapes 300 times of FF/REW using a video tape recorder and by counting a number of dropouts per 0.2μsec. or more before and after the running.

TABLE 1

| | Tape thickness (μm) | Tape width W1 (mm) | Flange width W2 (mm) | (U2 + D2) − (U1 + D1) (μm) | Output Variation (%) | Dropout increase (No./μsec) |
|---|---|---|---|---|---|---|
| Ex. 1 | 10.8 | 12.65 | 13.55 | −0.3 | 20 | 100 |
| Ex. 2 | 10.2 | 12.65 | 13.20 | −0.1 | 10 | 230 |
| Ex. 3 | 6.5 | 6.35 | 7.25 | −0.2 | 35 | 170 |
| Comparative Ex. 1 | 10.6 | 12.65 | 14.00 | −0.2 | 65 | 120 |
| Comparative Ex. 2 | 10.4 | 12.65 | 13.50 | +0.2 | 20 | 2500 |
| Comparative Ex. 3 | 6.3 | 6.35 | 7.60 | −0.4 | 80 | 110 |
| Comparative Ex. 4 | 6.6 | 6.35 | 7.20 | +0.1 | 40 | 1800 |

As apparent from Table 1, the variation of the outputs was low in the magnetic tape cassettes employing the tape reels in which a maximum value of the distance from the upper and lower flanges to the ends of the magnetic tape is 0.5 mm or more, and less than 1.0 mm. Moreover, the increase of the dropouts has been remarkably restrained in the magnetic tape cassettes employing the tape reels in which the distance from the upper and lower flanges to the ends of the back layer is larger than the distance from the upper and lower flanges to the ends of the nonmagnetic support and to the ends of the magnetic layer.

Next, material for molding the tape reels which are suitable for the embodiments of the invention and other embodiments will be described.

The upper flange 32 of the tape reel 30 is preferably formed of transparent resin from a viewpoint of confirming a remaining amount of the tape. The lower flange 33 integrally provided with the reel hub 31 around which the magnetic tape 20 is wound is preferably constructed by molding synthetic resin as described below.

(1) POM (polyacetal) resin molded in consideration of sliding performance (wear resistance), (2) PS (polystyrene) added with Si (silicone) and resin molded in consideration of cost performance, (3) ABS (acrylonitrile-butadiene-styrene) resin, ABS resin added with PC (polycarbonate), PC resin or PC resin added with glass fiber for reinforcement in consideration of strength, and so on.

However, the inventors have found as a result of the intensive study that there may still exist a concern, in the lower flange of the tape reel in the embodiments of the invention and other embodiments, that the lower flange may be abutted against an edge of an opening of a lower cassette half and scrape each other to generate abrasion powder. Also, a dropout of a signal due to adhesion of the abrasion powder to the magnetic tape may happen, such that there is still room for further improvement. Measures for the improvement which the inventors have found will be explained hereunder.

Figure 3:
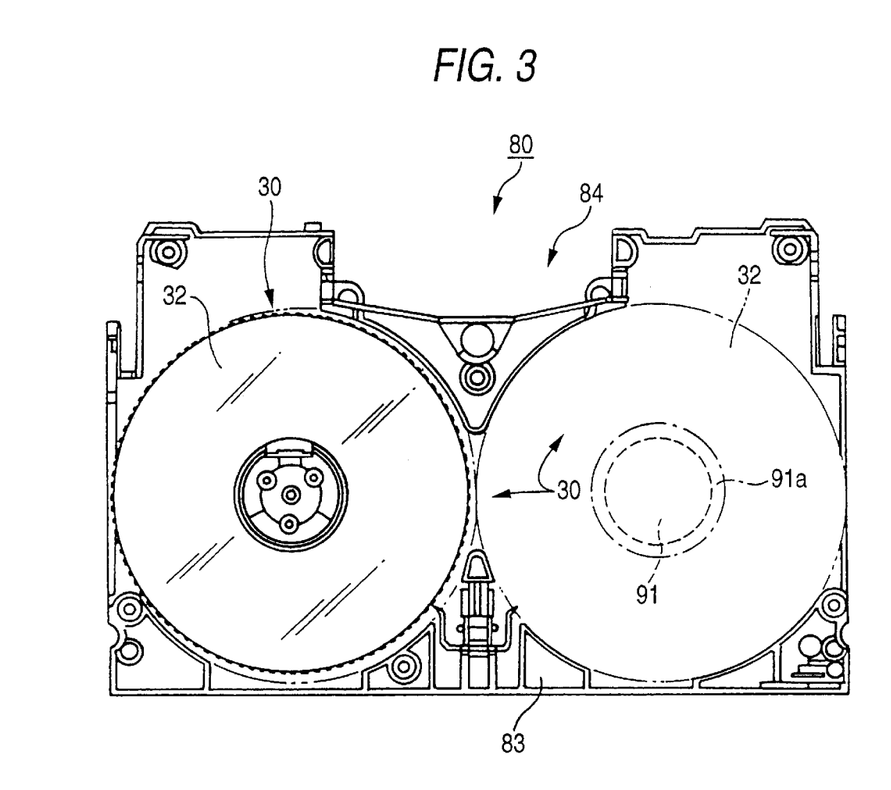
FIG. 3 is a plan view showing a general structure of a magnetic tape cassette to which a magnetic tape and a tape reel in the embodiments according to the invention can be applied.

In the magnetic tape cassette 30 employing the tape reel 10 and the magnetic tape 20 according to the embodiments of the invention and the other embodiments, when an upper cassette half 82 is removed, a pair of the tape reels 30 (one of the tape reels is omitted in the drawing) are rotatably mounted in a lower cassette half 83 as shown in FIG. 3.

Figure 4:
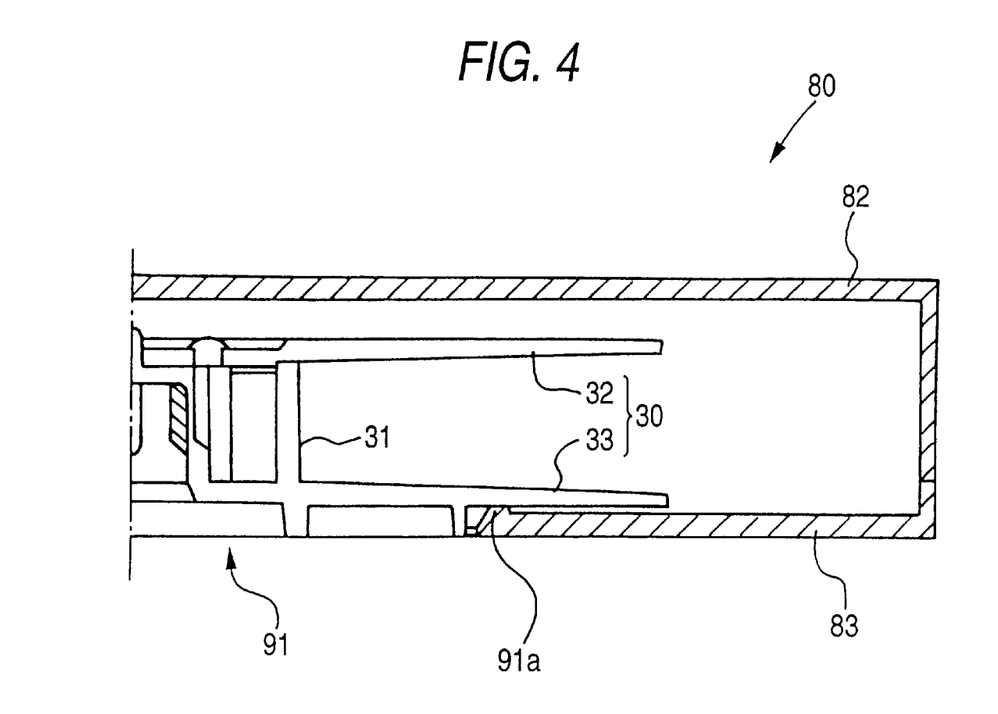
FIG. 4 is a sectional view of a part showing a structure of the magnetic tape cassette.

In a structure as shown in cross section in FIG. 4, the lower flange 33 is held in a state where its center part is engaged in an opening 91 formed in the lower cassette half 83, and a part of the lower flange 33 is mounted on an edge (projecting frame) 91a of the opening 91.

In a case where the magnetic tape cassette 80 is mounted on a video apparatus to conduct recording and reproduction, as the pair of the tape reels 32 rotate to run the magnetic tape 20, the pair of the tape reels 30 are raised floatingly and the lower flange 33 will not get in touch with the edge 91a. However, during transportation as a product, there is a risk that they may get in touch with each other as shown in the drawing and scrape each other, resulting in occurrence of abrasion powder.

Therefore, as a measure for improvement, the lower flange 33 including the reel hub 31 composing the pair of the tape reels 10 has been molded from the following resin material.

Specifically, the lower flange 33 was molded of resin material of ABS resin containing 0.2 to 1.2% of a compound of phosphate ester, preferably ethylene-bis-phosphate of phosphate ester.

The ABS resin has been selected for reasons such as strength, dimensional stability, production cost, prevention of dimensional change in an ambient temperature at 80° C. during transportation, etc., and ethylene-bis-phosphate of phosphate ester has been selected as an additive having vibration suitability, that is, good sliding performance, and heat resistance. Further, a ratio of adding the additive has been calculated from an experiment, for preventing contamination of molds by the additive.

Result of the experiment: In a case where the content of ethylene-bis-phosphate of phosphate ester is smaller than 0.2%, it is not effective with respect to the aforesaid vibration suitability or so, and in a case where the content is larger than 1.2%, contamination of the molds during continuous molding may occur.

The ABS resin has been selected for reasons such as strength, dimensional stability, production cost, prevention of dimensional change in the ambient temperature at 80° C. during transportation, etc., and the compound of phosphate ester, preferably ethylene-bis-phosphate has been selected as the additive having vibration suitability and heat resistance. Further, the ratio of adding the additive has been calculated from the experiment, for preventing contamination of the molds when molding.

Accordingly, the mold will not be soiled when the tape reels are continuously molded, and productivity can be enhanced. In addition, because the strength and vibration suitability are improved, abrasion powder will not occur due to abrasion during transportation of the products and production steps, and the problems of dropouts of signals due to adhesion of the powder to the magnetic tape, fractures, chips, etc. can be prevented.

Furthermore, effects such as the tape reel having excellent dimensional stability, is free from deformation due to the ambient temperature during transportation, and the production cost not rising, and so on can be obtained.

INDUSTRIAL APPLICABILITY

As described herein above, the tape reel according to the invention has a maximum value of 0.5 mm or more and less than 1.0 mm of the distance from the upper and lower flanges to the lateral ends of the magnetic tape. Accordingly, variation of outputs and dropouts can be remarkably restrained and irregular winding can be reliably prevented.

In the magnetic tape according to the invention, the distance from the upper and lower flanges to the ends of the back layer is larger than the distance from the upper and lower flanges to the ends of the nonmagnetic support or to the ends of the magnetic layer. Accordingly, the dropouts can be more remarkably restrained.

Further, the magnetic tape cassette provided with at least one of the above described tape reels and the above described magnetic tape can conduct more accurate recording and reproduction, remarkably restraining the variation of the outputs and the dropouts.

What is claimed is:

1. A tape reel comprising an upper flange and a lower flange respectively provided at an upper end and a lower end of a cylindrical reel hub around which a magnetic tape is wound, said magnetic tape having a width of 6.32 mm to 12.65 mm, wherein a maximum value of a sum of a distance from said upper flange to an upper lateral end of said magnetic tape and a distance from said lower flange to a lower lateral end of said magnetic tape is 0.5 mm or more, and less than 1.0 mm, and wherein said lower flange is molded of synthetic resin including ABS resin mainly containing a compound of phosphate ester.

2. The tape real as claimed in claim 1, wherein said compound of phosphate ester is contained in an amount of 0.2 to 1.2%.

3. A magnetic tape cassette comprising a magnetic tape, and a tape reel having an upper flange and a lower flange respectively provided at an upper end and a lower end of a cylindrical reel hub around which said magnetic tape is wound, said magnetic tape having a width of 6.32 mm to 12.65 mm, wherein a maximum value of a sum of a distance from said upper flange to an upper lateral end of said magnetic tape and a distance from said lower flange to a lower lateral end of said magnetic tape is 0.5 mm or more, and less than 1.0 mm, and wherein said lower flange is molded of synthetic resin including ABS resin mainly containing a compound of phosphate ester.

4. The magnetic tape cassette as claimed in claim 3, wherein said compound of phosphate ester is contained in an amount of 0.2 to 1.2%.

5. The magnetic tape cassette as claimed in claim 3, wherein said magnetic tape includes a nonmagnetic substrate, a magnetic layer provided on one face of said nonmagnetic substrate and a back layer provided on the other face of said nonmagnetic substrate, and in a state where said magnetic tape is wound around said tape reel, a distance from said upper flange and said lower flange to lateral ends of said back layer is larger than a distance from said upper flange and said lower flange to lateral ends of said nonmagnetic substrate or to lateral ends of said magnetic layer.

6. The magnetic tape cassette as claimed in claim 5, wherein in said state where said magnetic tape is wound around said tape reel, said distance from said upper flange and said lower flange to said lateral ends of said back layer is larger than both said distance from said upper flange and said lower flange to said lateral ends of said nonmagnectic substrate and said distance from said upper flange and said lower flange to said lateral ends of said magnetic layer.

7. The magnetic tape cassette as claimed in claim 3, wherein a thickness of said magnetic tape is 6 $\mu$m or more and, less than 11 $\mu$m.

* * * * *